United States Patent [19]

Obermayer et al.

[11] 4,365,594
[45] Dec. 28, 1982

[54] WATER-COOLED, MULTI-CYLINDER INTERNAL COMBUSTION ENGINE

[75] Inventors: Bertram Obermayer; Othmar Skatsche; Josef Greier, all of Graz, Austria

[73] Assignee: Hans List, Graz, Austria

[21] Appl. No.: 180,459

[22] Filed: Aug. 22, 1980

[30] Foreign Application Priority Data

Aug. 28, 1979 [AT] Austria .................. 5758/79

[51] Int. Cl.$^3$ .............................................. F02F 1/36
[52] U.S. Cl. ..................... 123/41.82 R; 123/193 H; 123/193 CH
[58] Field of Search ............ 123/41.72, 41.82 R, 123/193 R, 193 H, 193 CH, 41.74

[56] References Cited

U.S. PATENT DOCUMENTS

| | | | |
|---|---|---|---|
| 3,691,914 | 9/1972 | Reisacher et al. | 123/193 CH |
| 3,824,971 | 7/1974 | Skatsche et al. | 123/193 H |
| 4,092,956 | 6/1978 | List et al. | 123/193 CH |

FOREIGN PATENT DOCUMENTS 1576726  5/1970  Fed. Rep. of Germany ... 123/41.82

Primary Examiner—Craig R. Feinberg
Attorney, Agent, or Firm—Watson, Cole, Grindle & Watson

[57] ABSTRACT

In a water-cooled, multi-cylinder internal combustion engine, which comprises a cylinder block, a cylinder head, and a cooling jacket, all cast in one piece and wherein the cylinder head comprises, for each cylinder of the cylinder block and on one longitudinal side thereof, an intake and exhaust duct as well as valve guide sockets and on the other longitudinal side a mounting socket for an injection nozzle or sparking plug, forming a connection between the end wall of the cylinder and the cooling jacket, at least one fin is provided on the side where the mounting socket is arranged to make an additional connection between the end wall of the cylinder and the cooling jacket.

This arrangement compensates for the differential section modulus between the two longitudinal sides of the cylinder head regarded as a bending section, that is to say, the neutral axis of the cylinder head is shifted, at least approximately, back into the plane which contains the cylinder axes. This achieves an even distribution of combustion forces from the end wall of the cylinder to the cooling jacket and by comparison with the conventional arrangement reduces noise emission from the exposed longitudinal sides of the cylinder head.

3 Claims, 2 Drawing Figures

WATER-COOLED, MULTI-CYLINDER INTERNAL COMBUSTION ENGINE

BACKGROUND OF THE INVENTION

This invention relates to a water-cooled, multi-cylinder internal combustion engine comprising a cylinder block, a cylinder head, and a cooling jacking, all cast in one piece, the cylinder head comprises, for each cylinder of the cylinder block and on one longitudinal side thereof, an intake and exhaust duct as well as valve guide sockets and on the other longitudinal side a mounting socket for an injection nozzle or sparking plug, forming a connection between the end wall of the cylinder and the cooling jacket.

DESCRIPTION OF THE PRIOR ART

In conventional engines of the kind specified the end wall of each cylinder is connected to the longitudinal side of the cooling jacket on that side where the intake and exhaust ducts are arranged by means of the intake and exhaust ducts themselves and its connection with the top side of the cooling jacket is made by means of the valve guide sockets which are cast integrally with the intake and exhaust ducts. On that side where the mounting socket for the injection nozzle or for the sparking plug is arranged the end wall of the cylinder has a connection through this socket only with the top side of the cooling jacket. This arrangement has the drawback that, on the one hand, transmission of combustion forces from the end wall of the cylinder to the cooling jacket, and thus to the engine unit as a whole, is highly asymmetrical and chiefly concentrated on the side of the intake and exhaust ducts whilst, on the other hand, in operation of the engine the great difference in the section modulus between the two longitudinal sides of the cylinder head gives rise to highly differential dynamic deformations in these longitudinal sides and thus to considerably higher noise emission in this region.

SUMMARY OF THE INVENTION

It is an object of the present invention to provide an improved cylinder head for an internal combustion engine of the kind specified in such a way as to avoid the above mentioned disadvantages.

According to the present invention this is achieved by the provision in the side where the mounting socket for the injection nozzle or for the sparking plug is arranged, of at least one, but preferably two fin(s) which make an additional connection between the end wall of the cylinder and the cooling jacket.

This arrangement compensates for the differential section modulus between the two longitudinal sides of the cylinder head regarded as a bending section, that is to say, the neutral axis of the cylinder head is shifted, at least approximately, back into the plane which contains the cylinder axes. This achieves an even distribution of combustion forces from the end wall of the cylinder to the cooling jacket and by comparison with the conventional arrangement reduces noise emission from the exposed longitudinal sides of the cylinder head.

According to a further development of this invention the fin, or fins may stem from the mounting socket or injector socket for the injection nozzle or sparking plug and extend to the cooling jacket thus avoiding the need for casting added parts on the end wall of the cylinder itself. The connection between the end wall of cylinder and the cooling jacket is reinforced by the fin or fins only from the injection nozzle/sparking plug mounting socket onwards.

According to a further development of this invention, as applied to internal combustion engines of the kind wherein the cooling jacket for the cylinders is cast with the aid of a two-part core split in a plane at right angles to the cylinder axis, the fin, or fins, would be provided only in the region of the upper core part and parallel to the cylinder axis. Such an arrangement has considerable advantages from the point of view of casting technique in as much as the additional fins need only be provided in one of the two core parts.

According to a further development of this invention the said fin, or fins, may extend down to the parting plane of the two-part core for the cooling jacket. In this way it is possible to achieve maximum possible fin length without sacrificing the advantage obtained by confining the fins to the upper core part region only.

DESCRIPTION OF THE DRAWINGS

The invention is more specifically described with reference to an embodiment thereof illustrated by way of example in the accompanying drawings wherein.

DESCRIPTION OF THE PREFERRED EMBODIMENT

Figure 1:
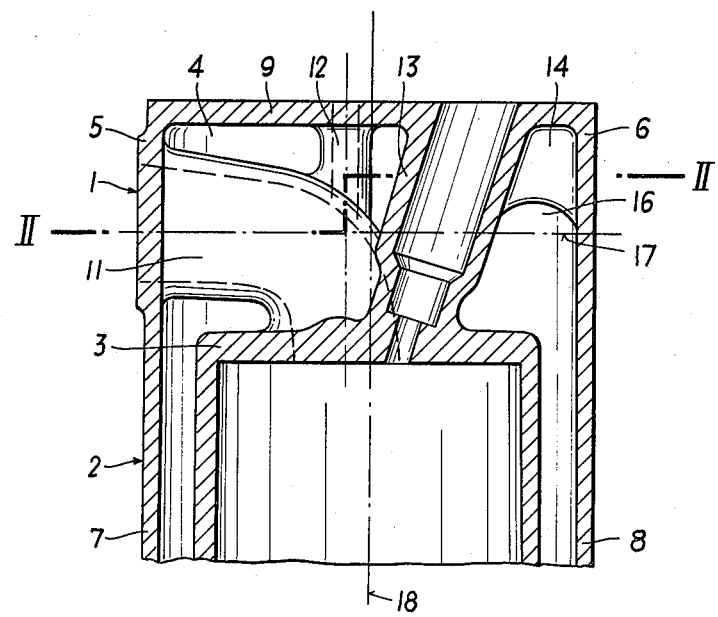
FIG. 1 is a vertical part-sectional view through the cylinder head region in an internal combustion engine according to this invention, the section being taken on line I—I in FIG. 2.
Figure 2:
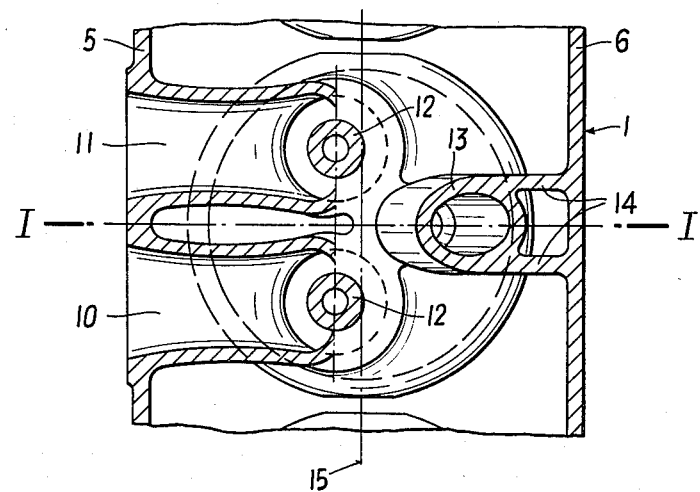
FIG. 2 is a horizontal part-sectional view, the section being taken on line II—II in FIG. 1.

The cylinder head 1 of a multi-cylinder internal combustion engine (not specifically shown) is cast in one piece with the cylinder block 2 and comprises a cooling jacket 4 which is bounded by the end wall 3 of the cylinder and further defined by the two longitudinal walls 5, 6 of the cylinder head 1 which continue in the cylinder block 2 as the cooling jacket walls 7 and 8, and the top wall 9 of the cylinder head 1 on which accessory units such as, for example the camshaft, valve drive, rocker cover etc. are mounted (not shown).

The connection between the end wall 3 of the cylinder and the cooling jacket 4 is made by means of intake and exhaust ducts 10 and 11 respectively, valve guide sockets 12, an injector socket 13 for an injection nozzle or a spark plug (not shown) and fins 14. More particularly, the connection of the left hand side of the cylinder end wall 3, as viewed in the direction of the crankshaft axis 15, to the longitudinal wall 5 of cylinder head 1 is obtained by means of the walls of the intake and exhaust ducts 10 and 11, and to the top wall 9 of the cylinder head 1 by means of the valve guide sockets 12. The connection from the right hand side of the end wall 3 of the cylinder to the top wall 9 of the cylinder head 1 is made by means of the mounting socket 13 for the injection nozzle or the spark plug and to the longitudinal wall 6 of cylinder head 1 by means of the fins 14.

The fins 14, which in this arrangement are provided only in the region 16 of the upper casting core part for the cooling jacket 4 and extend approximately to the parting plane 17 in the core, indicated by chain-dotted lines, ensure an at least approximately equal section modulus for the two longitudinal walls 5 and 6 of the cylinder head 1 which promotes even distribution of combustion forces from the end wall 3 of the cylinder to the cooling jacket 4 and to the longitudinal walls 5 and 6 of the cylinder head 1, and thus also less noise emission from the longitudinal walls 5 and 6.

Moreover, the fact that the fins 14 which extend from the injector socket 13 are arranged only in the region of the upper core part for the cooling jacket 4 and extend parallel to the cylinder axis 18 as illustrated, greatly simplifies the casting of the cylinder head/cylinder block unit (1 and 2).

I claim:

1. A water-cooled, multi-cylinder internal combustion engine comprising, a cylinder block, a cylinder head having a top end wall, and a cooling jacket, all of a one-piece casting construction, said cylinder head comprising, for each cylinder of said cylinder block, an intake and an exhaust duct both extending from only one longitudinal side wall of said cylinder head and opening substantially into one longitudinal side of said head, valve guide sockets located at said one longitudinal side, an injector socket at an opposite longitudinal side of said cylinder head, at least two fins are provided at said opposite longitudinal side, said ducts, said valve guide sockets, said injector socket and said fins solely interconnecting the end wall of said cylinder and said cooling jacket, whereby an at least approximately equal section modulus for said one longitudinal side wall and for an opposite longitudinal side wall of said cylinder head is assured to thereby promote an even distribution of combustion forces from said end wall of said cylinder to said cooling jacket and to said longitudinal walls of said cylinder head, and to thereby also effect a reduced noise emission from said longitudinal walls, and wherein said fins are spaced from one another extending parallel from said injector socket to said cooling jacket and are provided symmetrically to a plane comprising the cylinder axis and lying at right angles to said longitudinal side walls.

2. An engine according to claim 1, wherein said cooling jacket defines a casting of a two-part core having its parting plane lying at right angles to the cylinder axis, and wherein said fins are arranged only in the region of the upper core part and parallel to the cylinder axis.

3. An engine according to claim 1, wherein said fins extend down to the parting plane of the core used for casting the cooling jacket.

* * * * *